Patented Mar. 6, 1945

2,370,879

UNITED STATES PATENT OFFICE 2,370,879

PROCESS OF MAKING CHEESE

Zola D. Roundy, Chicago, and Havard L. Keil, Clarendon Hills, Ill., assignors to Armour and Company, Chicago, Ill., a corporation of Illinois No Drawing. Application October 16, 1942, Serial No. 462,308

9 Claims. (Cl. 99—116)

This invention relates to methods of making cheese and involves processes in which proteolytic enzymes, particularly tryptic enzymes are employed for producing development of body characteristics.

This application is a continuation in part of our copending application Serial No. 288,190, filed August 3, 1939, now abandoned, and is in some respects an improvement on the invention set forth in our copending application Serial No. 275,554, filed May 24, 1939, now abandoned. In Serial No. 275,554 we describe a process in which the functions ordinarily associated with aging are speeded up and controlled so as to produce in a relatively short time a cheese product having all the qualities normally assigned to our aged cheese. The aging process is speeded up through the use of tryptic enzymes for attacking the curd and the activity of these enzymes is so controlled as to eliminate objectionable flavors and odors.

By the improvement of the present invention we employ tryptic enzymes in a changed procedure which gives rise to further advantages in the cheese-making art. In the improved procedure of this invention we treat the curd, preferably before drawing off the whey, to inhibit the activity of acid-forming organisms while still permitting the survival of the tryptic enzymes. In fact, the treatment we use has the effect of enhancing or speeding up the activity of the enzymes.

In carrying out our process we add a lactic acid starter as in the usual procedure. This starter includes the acid-forming organisms which are heat-sensitive. Then we add the tryptic enzyme material and "set" the milk with a coagulating agent, either rennin or pepsin, preferably rennin. at a temperature of about 84° F. to 88° F. The curd is next cut and cooked at the usual temperatures of 90° F. to 101° F.

In prior practices the whey is drained from the curd at the cooking stage and the curd thereafter cut in blocks. However, we heat the curd preferably in the presence of the whey to a point which will inhibit further action of acid-forming bacteria and at the same time enhance the action of the tryptic enzymes.

For convenience of description we use the term "milk" to designate the material acted upon through the treatment steps up to the point of coagulation, and use the term "milk material" to designate the material acted upon from the beginning of the process through coagulation to the stage where the curd body development is completed.

The tryptic enzymes are the proteolytic enzymes of the animal pancreas which are commonly marketed under the name of Trypsin and sometimes called pancreatin. The material commonly known as trypsin or pancreatin contains as well as pure trypsin minor amounts of chymotrypsin, erepsin and other proteolytic enzymes, and amylopsin and steapsin, the amylopsin being a starch-splitting enzyme and the steapsin being the lypolytic or fat-splitting enzyme of the pancreas. By the terms "tryptic enzyme material" or "tryptic material" as used herein, we mean the material above described commonly known as trypsin or any material of such type derived from animal pancreas and containing a proteolytic enzyme. The term "tryptic enzymes" is taken to include the proteolytic enzymes from animal pancreas.

The acid-forming organisms which are added in the lactic acid starter are Streptococcus lactis and associative organisms such as Streptococcus citrovorus and Streptococcus paracitrovorus. The temperatures we use in this heating step are sufficient to give these acid-forming organisms severe heat shock so that further development is substantially prevented. Some of these acid-formers are permanently destroyed by the heating step and most of them are put out of action by heat shock.

The heating step which serves in its one function for controlling the bacterial activity is especially important in view of the fact that the curd which has been affected by tryptic enzyme action makes a more favorable medium for the propagation of certain of these bacteria and it is only by the effect of the heating step that this effect of the tryptic enzymes can be dealt with effectively.

We find that the acid-forming bacteria are affected at temperatures above 106° F. The upper limit of temperature must be below that at which the tryptic enzymes are destroyed. Since these enzymes are destroyed at about 130° F., the upper limit of the temperatures which we can use is about 126° F. or 128° F. However, we prefer to use temperatures well within these limits, as 110° F. to 120° F., since the use of temperatures as high as 110° F. insures adequate check on the organisms, and temperatures not higher than 120° F. insure against destruction of the enzymes. Though not all of the acid-forming bacteria are killed at temperatures within the range we employ, the practical effect is to substantially destroy further action of the organisms in developing acidity.

In addition to the function of limiting bacterial action, the heating step has the added advantage of enhancing or stepping up the activity of the tryptic enzymes. As the temperature is raised these enzymes become more active just below the temperature at which they are destroyed.

Preferably the whey is still present during this heating stage, and the mixture is held at the stated temperature for a few minutes, for example, about 15 minutes. Then we draw the whey from the curd. Next the curd is allowed to mat and is cut into slabs which may be kept in a cooler for about two days to a week. The length of this aging period may vary depending upon the temperature at which the curd is kept, since, in general, higher temperatures permit of shorter aging periods. It is significant here also that by controlling the temperature at which the aging takes place the period of aging may be controlled to suit the convenience of the manufacturer.

The tryptic enzyme material is especially effective in producing the desired protein alteration for developing body characteristics, much more effectively than proteolytic enzyme material from other sources. For this purpose pepsin, for example, will not suffice, but in our process pepsin may be used to serve another quite important function, so it is a further feature of our invention to use along with the tryptic enzyme material a pepsin material. The pepsin material is derived from animal stomachs and contains the enzyme pepsin. When it is employed along with the tryptic material somewhat better control can be effected than where the tryptic material is used alone. The amount of the pepsin material which can be used is subject to much greater variation than the amount of the tryptic material, and it seems that the combined action of the enzymes contained in these materials permits wider latitude of conditions. For example, when the pepsin material is used along with the trypsin material in this process the amount of the pepsin material may be increased twelvefold without undesirable results, but where the amount of the tryptic material be increased threefold the curd will likely be so broken down as to destroy the body. It is possible to use less than 50 c. c. of a tryptic material which tests 1:1.666 U. S. P. trypsin to each 100 pounds of milk and good results may be obtained if only 20 c. c. of such material per 100 pounds of milk is used.

When the pepsin material is used it is not essential to add rennin since the pepsin is also a coagulating agent and will form a curd. However, the pepsin is found not to form as desirable a curd as does rennin, and even when we employ pepsin we prefer also to add rennin to effect the coagulation. Of all the known enzymes, only rennin and pepsin have qualities which make them useful as coagulants in cheese production, and as used herein the term "coagulating agent" will include rennin, pepsin, or a mixture of these.

We have further discovered that instead of the ordinary trypsin or pancreatin it is better to use a tryptic material which is substantially free of steapsin. It is the further feature of our improvement that we find it better to use a tryptic material which is substantially free of enzyme material. We have found that by using a tryptic material substantially free of steapsin we avoid an objection which may best be described by the term "slight rancidity," and we therefore emphasize the use of a tryptic enzyme material which is substantially free of steapsin. Normally the common trypsin or pancreatin might be regarded as substantially free of steapsin since so little is naturally included, but by "substantially free" we mean the material used does not even contain a substantial portion of the steapsin normally contained in the common trypsin or pancreatin.

It is understood that while advantageous to use the tryptic material which is substantially free of steapsin and to use the pepsin material in addition to the tryptic material, our invention is not limited to the practice of these features.

We shall now give a detailed example of how our invention can be carried out without, however, limiting ourselves thereto.

To 1000 pounds of milk we add about 1% of a lactic acid starter in the usual way to ripen the milk. The tryptic enzyme material to be used is then added.

The quantity of this tryptic material will depend in part upon the activity thereof. It should preferably be added prior to coagulation through action of rennin or pepsin since if rennin is added first the milk curdles, making it difficult to incorporate the tryptic enzyme material. The tryptic enzyme material may be added in powder or liquid form and using the liquid solution we may add about 300 to 700 c. c. of a solution testing by U. S. P. methods a trypsin strength of 1:1.666.

When we use pepsin in addition to the tryptic material we add about 10 to 15 grams of a pepsin material prepared from animal stomachs for each 1000 pounds of milk, the pepsin material testing by U. S. P. methods a pepsin strength of 1:3000.

After adding the tryptic enzyme material we then set the milk, preferably with rennin, at about 84° F. to 90° F. The amount of rennin having a strength of about 1:5000 for about 3 ounces for each 1000 pounds of milk. Coagulation occurs rapidly in the milk while at the setting temperature stated. Even when we employ a pepsin material, in addition to the tryptic material for effecting the body characteristics of the curd, we prefer to add the rennin to effect coagulation. Though pepsin in itself serves also as a coagulant, the rennin is much to be preferred in this function, and though where pepsin is used it is not essential to add another coagulant, we prefer to employ the rennin for the coagulating function.

The curd formed is then cut with ⅛ to ¼" curd knives and brought to a cooking temperature of about 100° F., substantially in accordance with the usual methods. When the curd has formed sufficiently, and the whey tests about 0.15% to 0.20% as lactic acid, we then increase the temperature without draining the whey to from about 110° F. to 120° F. At this point it will be helpful to recall that in prior processes the whey is drained off immediately after the ordinary cooking at a temperature of 90° F. to 100° F. In our process, however, we change the procedure at this point by heating the curd to a higher temperature. The temperatures we prefer to use at this stage, namely 110° F. to 120° F. inhibit the action of the lactic acid bacteria, but, in addition, the heating step applied to our kind of curd, namely, one which is subjected to the action of tryptic enzymes also appears to cause profound changes in the curd which become evident during the short aging period.

The curd is normally kept for about ten minutes at about 110° F. to 120° F. and thereafter we draw the whey. We permit the curd to mat after withdrawal of the whey, and then cut the curd into blocks or slabs. These slabs may be placed in a cooler at about 35° F., and held at this temperature for about two days to a week. The cheese then has fully developed body characteristics, and the flavor is set. It will be helpful to recall that between the steps of cutting the curd into blocks and obtaining a fully aged cheese we may entirely omit milling, salting, hooping, pressing, removal of the hoops, drying, and paraffining. Moreover, we have obtained aged or fully developed body characteristics comparable to that hitherto obtained only after weeks of aging.

By body characteristics we refer to the consistency, firmness, or substance of the cheese. A well-bodied cheese will feel firm and smooth as distinguished from "pasty," "mealy," "crumbly," etc., these evidences of body being well known to the cheese-making trade. Body characteristics can be identified by melting the curd, and a curd which upon application of heat, and with the usual salt added, will melt to form a smooth, free-flowing mass as distinguished from a stringy, ropy, or solid mass has fully developed body characteristics.

After the expiration of the short aging period the curd is heated to a temperature sufficiently high to destroy the added tryptic enzymes, and such temperature will be not less than about 130° F. Usually we heat the curd to about 150° F. or 160° F., since the higher temperatures makes the cheese more fluid and easier to pour from the heating vessel. If desired, the temperatures may be carried to 175° F. or even higher, without damage to the cheese. We have found, however, that if the temperature of the cheese is carried to not less than 130° F. that the activity of the added tryptic enzymes is substantially destroyed. In our customary practice of this part of the process we had an ordinary emulsifier such as sodium citrate, heat the curd in a suitable vessel to about 130° F. to 160° F., add salt and other desired condiments, then pour the molten cheese into suitable containers or packages and allow it to cool. Conveniently other prepared cheeses may be melted with the cheese prepared by this improved process, this other cheese being melted and blended in at this final heating step. Thus our process lends itself very effectively to blending with other cheeses.

As a result of our discoveries we are able to make a cheese having fully aged characteristics, particularly as regards to body, and having a satisfactory flavor, within two or three days from the time the milk is inoculated, a tremendous saving of time when compared with the many months that must elapse in prior processes. Moreover, our invention can be used with raw milk or pasteurized milk, and this is an added advantage.

In the improved process we find it very advantageous to hold the curd during the short aging period at relatively low temperatures, preferably from 30° F. to 50° F. This lower temperature permits of easier control of the tryptic enzyme action and helps in the production of a uniform cheese having precisely the desired body. In addition, the lower holding temperatures at this stage of the process serve to inhibit the activity of any acid-forming bacteria which escape destruction by the prior heating step so that these bacteria, then in relatively small numbers, will have no opportunity to become active and multiply. Thus it appears that the lower holding temperatures operate discriminantly against the acid-forming bacteria. The heating of the curd and whey at a temperature of from 110° F. to 120° F. is effective to inhibit the action of the acid-forming organisms and heat shock them into inactivity while the subsequent lower holding temperatures are believed to prevent the revival to activity of such organisms as may survive the heating step.

Though in the foregoing explanation theories have been advanced which are now believed to be corrected, we do not wish to be understood as disclaiming any part of the invention should it later be found that the improved results are best explained in some other way.

Although we have given in the above example certain specific quantities yielding good results, we wish it understood that these quantities can be modified without departing from the scope of our invention. The heating period during which the curd and whey is maintained, preferably at 110° F. to 120° F., will ordinarily be of the order of five to fifteen minutes, but this time may vary depending upon the quantity of milk, the temperatures used, etc.

What we claim as new and desire to secure by Letters Patent is:

1. In a process for preparing cheese, the steps of adding to a milk material a heat sensitive lactic acid developing organism, adding a tryptic enzyme material to the milk material for developing body characteristics, adding a coagulating agent to said milk material while in uncoagulated state to coagulate it and produce a curd, heating the curd to a temperature of from 106° F. to 128° F. to inhibit further action of said organism and enhance action of said enzyme, and after said enzyme has acted to develop body characteristics, heating the curd to a temperature in excess of 130° F. to destroy said enzyme.

2. In a process for preparing cheese, the steps of adding to a milk material a heat sensitive lactic acid developing organism, adding a tryptic enzyme material to the milk material for developing body characteristics, adding a coagulating agent to said milk material while in uncoagulated state to coagulate it and produce a curd, heating the curd to a temperature of from 110° F. to 120° F. to inhibit further action of said organism and enhance action of said enzyme, and after said enzyme has acted to develop body characteristics, heating the curd to a temperature in excess of 130° F. to destroy said enzyme.

3. In a process for preparing cheese, the steps of adding to a milk material a heat sensitive lactic acid developing organism, adding a tryptic enzyme material to the milk material for developing body characteristics, adding a coagulating agent to said milk material while in uncoagulated state to coagulate it and produce curd and whey, heating the curd in the presence of the whey to a temperature of 106° F. to 128° F. to inhibit further action of said organism and enhance action of said enzymes, drawing the whey from the curd, and after said enzymes have acted to develop body characteristics, heating the curd to a temperature in excess of 130° F. to destroy said enzymes.

4. A process as set forth in claim 1 in which said tryptic enzyme material is substantially free of steapsin.

5. In a process for preparing cheese, the steps of adding to a milk material a heat sensitive lactic acid developing organism, adding a tryptic enzyme material and peptic material to the milk material for developing body characteristics, adding a coagulating agent to said milk material while in uncoagulated state to coagulate it and produce a curd, heating the curd to a temperature of from 106° F. to 128° F. to inhibit further action of said organism and enhance action of said enzymes, and after said enzymes have acted to develop body characteristics, heating the curd to a temperature in excess of 130° F. to destroy said enzymes.

6. In a process for preparing cheese, the steps of adding to a milk material a heat sensitive lactic acid developing organism, adding a tryptic enzyme material which is substantially free of steapsin and also a pepsin material to the milk material for developing body characteristics, adding a rennin to said milk material while in coagulated state to coagulate it and produce a curd, heating the curd to a temperature of from 106° F. to 128° F. to inhibit further action of said organism and enhance action of said enzymes, and after said enzymes have acted to develop body characteristics heating the curd to a temperature in excess of 130° F. to destroy said enzymes.

7. A process as set forth in claim 6 in which the curd is heated to a temperature of from 110° F. to 120° F. to inhibit further action of said organism and enhance action of said enzymes.

8. In a process for preparing cheese, the steps of adding to a milk material a heat sensitive lactic acid developing organism, adding a tryptic enzyme material to the milk material for developing body characteristics, adding rennin to said milk material while in coagulated state to coagulate it and produce curd and whey, heating the curd in the presence of the whey to a temperature of from 110° F. to 120° F. to inhibit further action of said organism and enhance action of said enzymes, draining the whey from the curd, and after the enzymes of said tryptic material have acted to develop body characteristics heating the curd to a temperature in excess of 130° F. to destroy the tryptic enzymes.

9. In a process for preparing cheese, the steps of adding to a milk material a heat sensitive lactic acid developing organism, adding a tryptic enzyme material which is substantially free of steapsin to said milk material while in uncoagulated state for developing body characteristics, adding rennin to the milk to coagulate it and produce curd and whey, heating the curd in the presence of the whey to a temperature of from 110° F. to 120° F. to inhibit further action of said organism and enhance action of said enzymes, draining the whey from the curd, storing the curd during a further aging period at a temperature of from 30° F. to 50° F., and after said enzymes have acted to develop body characteristics heating the curd to a temperature in excess of 130° F. to destroy said enzymes.

ZOLA D. ROUNDY.
HAVARD L. KEIL.

CERTIFICATE OF CORRECTION.

Patent No. 2,370,879.                                       March 6, 1945.

ZOLA D. ROUNDY, ET AL.

It is hereby certified that error appears in the printed specification of the above numbered patent requiring correction as follows: Page 4, first column, line 15-16, claim 6, and second column, line 2-3, claim 8, for "coagulated" read --uncoagulated--; and that the said Letters Patent should be read with this correction therein that the same may conform to the record of the case in the Patent Office.

Signed and sealed this 19th day of June, A. D. 1945.

Leslie Frazer (Seal)                                          Acting Commissioner of Patents.

while in uncoagulated state to coagulate it and produce a curd, heating the curd to a temperature of from 106° F. to 128° F. to inhibit further action of said organism and enhance action of said enzymes, and after said enzymes have acted to develop body characteristics, heating the curd to a temperature in excess of 130° F. to destroy said enzymes.

6. In a process for preparing cheese, the steps of adding to a milk material a heat sensitive lactic acid developing organism, adding a tryptic enzyme material which is substantially free of steapsin and also a pepsin material to the milk material for developing body characteristics, adding a rennin to said milk material while in coagulated state to coagulate it and produce a curd, heating the curd to a temperature of from 106° F. to 128° F. to inhibit further action of said organism and enhance action of said enzymes, and after said enzymes have acted to develop body characteristics heating the curd to a temperature in excess of 130° F. to destroy said enzymes.

7. A process as set forth in claim 6 in which the curd is heated to a temperature of from 110° F. to 120° F. to inhibit further action of said organism and enhance action of said enzymes.

8. In a process for preparing cheese, the steps of adding to a milk material a heat sensitive lactic acid developing organism, adding a tryptic enzyme material to the milk material for developing body characteristics, adding rennin to said milk material while in coagulated state to coagulate it and produce curd and whey, heating the curd in the presence of the whey to a temperature of from 110° F. to 120° F. to inhibit further action of said organism and enhance action of said enzymes, draining the whey from the curd, and after the enzymes of said tryptic material have acted to develop body characteristics heating the curd to a temperature in excess of 130° F. to destroy the tryptic enzymes.

9. In a process for preparing cheese, the steps of adding to a milk material a heat sensitive lactic acid developing organism, adding a tryptic enzyme material which is substantially free of steapsin to said milk material while in uncoagulated state for developing body characteristics, adding rennin to the milk to coagulate it and produce curd and whey, heating the curd in the presence of the whey to a temperature of from 110° F. to 120° F. to inhibit further action of said organism and enhance action of said enzymes, draining the whey from the curd, storing the curd during a further aging period at a temperature of from 30° F. to 50° F., and after said enzymes have acted to develop body characteristics heating the curd to a temperature in excess of 130° F. to destroy said enzymes.

ZOLA D. ROUNDY.
HAVARD L. KEIL.

---

CERTIFICATE OF CORRECTION.

Patent No. 2,370,879.  March 6, 1945.

ZOLA D. ROUNDY, ET AL.

It is hereby certified that error appears in the printed specification of the above numbered patent requiring correction as follows: Page 4, first column, line 15-16, claim 6, and second column, line 2-3, claim 8, for "coagulated" read --uncoagulated--; and that the said Letters Patent should be read with this correction therein that the same may conform to the record of the case in the Patent Office.

Signed and sealed this 19th day of June, A. D. 1945.

Leslie Frazer (Seal)  Acting Commissioner of Patents.